(12) United States Patent
Murakami et al.

(10) Patent No.: US 9,662,953 B2
(45) Date of Patent: May 30, 2017

(54) STRUT-TYPE SUSPENSION DEVICE

(71) Applicant: TOYOTA JIDOSHA KABUSHIKI KAISHA, Toyota-shi, Aichi-ken (JP)

(72) Inventors: Takao Murakami, Toyota (JP); Yuji Homma, Nagoya (JP); Naoya Asaoka, Nissin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/121,970

(22) PCT Filed: Mar. 6, 2015

(86) PCT No.: PCT/IB2015/000285
§ 371 (c)(1),
(2) Date: Aug. 26, 2016

(87) PCT Pub. No.: WO2015/136346
PCT Pub. Date: Sep. 17, 2015

(65) Prior Publication Data
US 2017/0008362 A1 Jan. 12, 2017

(30) Foreign Application Priority Data
Mar. 10, 2014 (JP) .................. 2014-046665

(51) Int. Cl.
*B60G 15/00* (2006.01)
*B60G 15/06* (2006.01)

(52) U.S. Cl.
CPC .......... *B60G 15/068* (2013.01); *B60G 15/062* (2013.01); *B60G 2204/128* (2013.01); *B60G 2204/1242* (2013.01); *B60G 2204/418* (2013.01)

(58) Field of Classification Search
CPC ............... B60G 15/068; B60G 15/062; B60G 2204/1242; B60G 2204/128
See application file for complete search history.

(56) References Cited

U.S. PATENT DOCUMENTS

| | | |
|---|---|---|
| 5,454,585 A | 10/1995 | Dronen et al. |
| 5,467,971 A | 11/1995 | Hurtubise et al. |
| 6,923,461 B2 * | 8/2005 | Momose ............. B60G 15/063 280/124.155 |
| 7,997,395 B2 * | 8/2011 | Ohkita ................ B60G 15/063 188/322.22 |

(Continued)

FOREIGN PATENT DOCUMENTS

| | | | |
|---|---|---|---|
| CN | 1256248 C | 5/2006 | |
| JP | 62286816 A | * 12/1987 | ........... B60G 15/068 |
| JP | 2002-283820 A | 10/2002 | |

(Continued)

*Primary Examiner* — Faye M Fleming
(74) *Attorney, Agent, or Firm* — Oliff PLC (57) ABSTRACT

A strut-type suspension device includes an upper support; a shock absorber that is supported by the upper support; a coil spring that is arranged surrounding the shock absorber, between an upper spring seat and a lower spring seat; and a bearing that is arranged between the upper spring seat and the upper support. The upper support includes a mounting portion that has a support surface for supporting the bearing. The support surface is inclined with respect to a plane perpendicular to a shock absorber axis.

3 Claims, 5 Drawing Sheets

(56) References Cited

U.S. PATENT DOCUMENTS

2003/0006574 A1    1/2003   Momose et al.
2004/0256830 A1   12/2004   Omi et al.

FOREIGN PATENT DOCUMENTS

| JP | 2007-100889 A | 4/2007 |
|----|---------------|--------|
| WO | 89/05242 A1 | 6/1989 |
| WO | 02-40299 A1 | 5/2002 |

\* cited by examiner

STRUT-TYPE SUSPENSION DEVICE

BACKGROUND OF THE INVENTION

1. Field of the Invention

The invention relates to a strut-type suspension device for a vehicle.

2. Description of Related Art

A strut-type suspension device in which a shock absorber also serves as a suspension support is known as one suspension device. The strut-type suspension device has a structure in which an upper end side of the shock absorber (strut) is mounted to a vehicle body side via a supporting member such as an upper support, and a lower end side of the shock absorber (strut) is mounted to a wheel side via a connecting member.

In the strut-type suspension device, a coil spring is arranged surrounding the shock absorber. A lower end of the coil spring is supported by a lower spring seat that is fixed to a body of the shock absorber, and an upper end of the coil spring is supported by an upper spring seat. The upper spring seat is rotatably supported by the upper support via a bearing.

The bearing is typically arranged orthogonal to a shock absorber axis (strut axis), with the bearing rotational axis aligned with the strut axis. Therefore, the upper spring seat rotates around the bearing rotational axis, while the lower spring seat rotates around a king pin axis. When the upper spring seat and the lower spring seat rotate simultaneously, a rotational moment is generated around the king pin axis, and as a result, the ability to travel in a straight line is impaired.

Japanese Patent Application Publication No. 2002-283820 (JP 2002-283820 A) describes a strut-type suspension device that aligns a king pin axis with a bearing rotational axis by mounting a bearing and an upper spring seat at an angle to a lower portion of an upper support via an angle adjustment member. Similarly, U.S. Pat. No. 5,454,585 describes a strut-type suspension device in which a circular flange member is interposed between an upper support and a bearing, to align a king pin axis with a bearing rotational axis.

With both JP 2002-283820 A and U.S. Pat. No. 5,454,585, an inclined member that is inclined is interposed between the upper support and the bearing in order to align the king pin axis with the bearing rotational axis. Using this inclined member leads to an increase in the number of parts, and cost and weight due to using the inclined member increase, which is undesirable. Moreover, in the assembly process of the suspension device, the inclined member must be properly assembled in a predetermined position in order to align the king pin axis with the bearing rotational axis, so assembly work is not easy.

SUMMARY OF THE INVENTION

The invention thus provides a strut-type suspension device having a structure that easily inclines a bearing rotational axis with respect to a shock absorber axis.

One aspect of the invention relates to a strut-type suspension device. This strut-type suspension device includes an upper support; a shock absorber that is supported by the upper support; a coil spring that is arranged surrounding the shock absorber, between an upper spring seat and a lower spring seat; and a bearing that is arranged between the upper spring seat and the upper support. The upper support includes a mounting portion that has a support surface for supporting the bearing, and the support surface is inclined with respect to a plane perpendicular to a shock absorber axis.

According to this aspect, the support surface for supporting the bearing is inclined with respect to the plane perpendicular to the shock absorber axis, so when the bearing is mounted to the support surface, the rotational axis of the bearing is able to be inclined with respect to the shock absorber axis. As a result, a rotational moment around a king pin axis is able to be suppressed, compared to when a rotational axis of the bearing is aligned with the shock absorber axis.

In the aspect described above, an angle between the support surface and a king pin axis may be substantially a right angle, and a king pin axis and a bearing rotational axis may be substantially aligned. As a result, a rotational moment around the king pin axis is substantially able to be reduced to close to zero.

In the aspect described above, the mounting portion may include the support surface, and a protruding face disposed around an inner peripheral edge of the support surface, and an angle between the support surface and the protruding face may be greater than 90°. Also in the aspect described above, the angle between the support surface and the protruding face may be equal to or greater than the sum of an angle between the king pin axis and the shock absorber axis plus 90°. As a result, the bearing is able to be easily inserted onto the support surface of the mounting portion when assembling the shock absorber to the upper support.

According to this aspect of the invention, a strut-type suspension device having a structure that easily inclines a bearing rotational axis with respect to a shock absorber axis is able to be provided.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
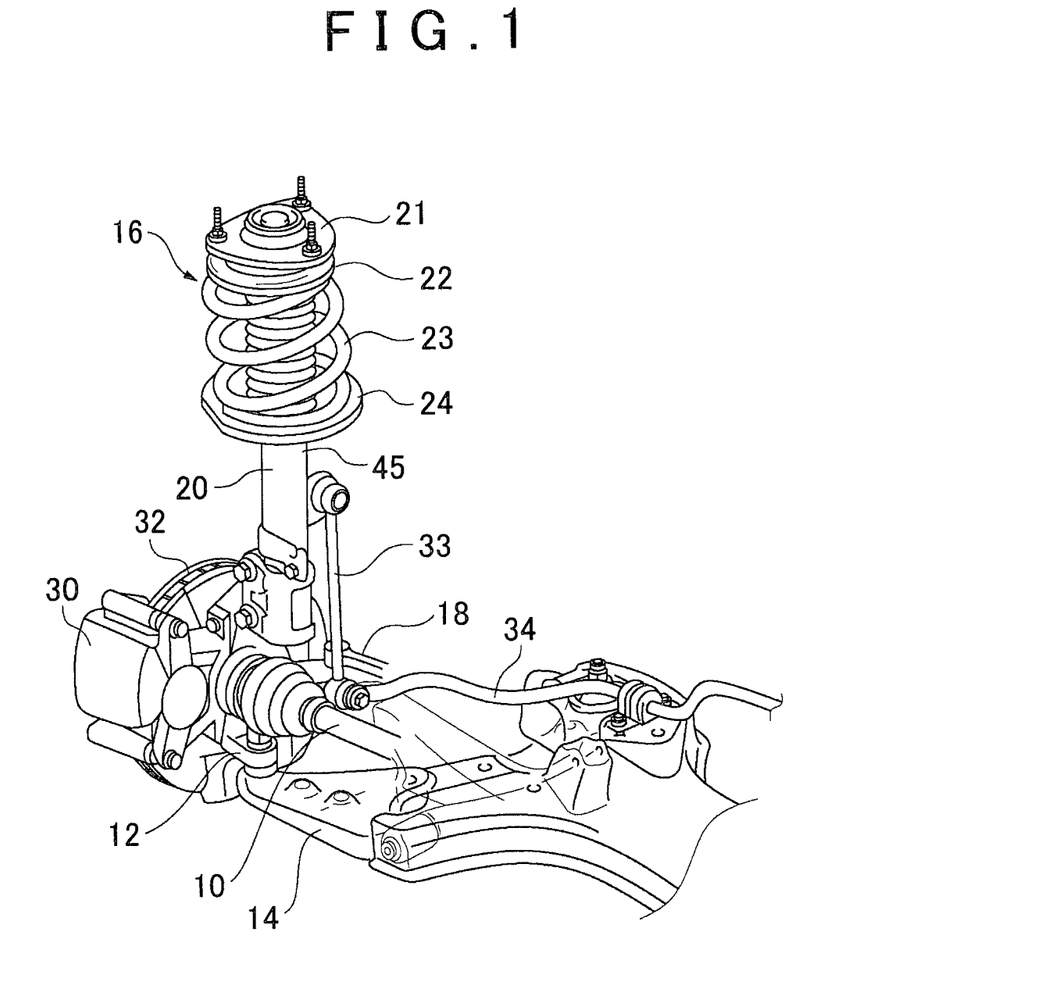
FIG. 1 is a perspective view of a strut-type suspension device according to one example embodiment of the invention, and the surrounding structure.

Hereinafter, example embodiments of the invention will be described with reference to the accompanying drawings. FIG. 1 is a perspective view of a strut-type suspension device according to one example embodiment of the invention, and the surrounding structure. The relationship between the strut-type suspension device of a wheel support device, and the surrounding structure, is described with reference to FIG. 1, and the details of the suspension device of the example embodiment will be described with reference to FIGS. 2 to 4.

The wheel support device includes a drive shaft 10 that transmits rotational driving force to a wheel, a knuckle 12 that rotatably supports the wheel, a lower arm 14 that connects the knuckle 12 to a vehicle body, and a suspension device 16.

An axle hub, not shown, that supports a wheel is inserted through the center portion of the knuckle 12. Also, a caliper 30 that forms a brake device is fixed to the knuckle 12. The caliper 30 includes a wheel cylinder into which operating hydraulic pressure is introduced, and a brake pad that is driven by hydraulic pressure supplied from this wheel cylinder, and the like. The caliper 30 generates braking force by squeezing a disc rotor 32 with this brake pad. A base end portion of the lower arm 14 is pivotally connected to the vehicle body, and a tip end portion that extends from this base end portion toward the outside in the vehicle width direction is pivotally supported by the knuckle 12 via a ball joint. A tie rod 18 that extends from a steering device, not shown, mounted to the vehicle body is connected to the knuckle 12, and is configured to be able to rotatably operate (i.e., turn) the wheel.

The suspension device 16 includes a shock absorber 20 in which a piston, not shown, is housed inside a housing 45 filled with operating fluid. The shock absorber 20 generates damping force by viscous resistance when the operating fluid passes through an orifice formed in the piston. A lower end portion of the housing 45 is connected to the knuckle 12 via a bracket that is mounted to the housing 45. A piston rod that protrudes from the housing 45 of the shock absorber 20 is mounted to the vehicle body via an upper support 21. A line that connects a mounting center point of the shock absorber 20 of the upper support 21 to the ball joint is set as a king pin axis.

An upper spring seat 22 is supported with respect to the upper support 21 via a bearing, and a lower spring seat 24 is mounted to the housing 45. A compressed coil spring 23 is interposed between the upper spring seat 22 and the lower spring seat 24. In the suspension device 16 of this example embodiment, the bearing is arranged between the upper support 21 and the upper spring seat 22, such that the rotational axis of the bearing is substantially aligned with the king pin axis.

Steering torque input from a steering wheel, not shown, is transmitted to a gear box via a steering column, also not shown. In the gear box, rotary motion of the steering wheel is converted into linear motion in the vehicle width direction and transmitted to the tie rod 18. The tie rod 18 is joined to the knuckle 12 via a connecting member, such that when a driver steers (i.e. turns) the steering wheel, the knuckle 12 pivots by the motion of the tie rod 18 and the wheel turns. A stabilizer 34 is connected to the vehicle body via a stabilizer link 33. Roll rigidity of the vehicle body is increased by restoring force with respect to twisting of the stabilizer 34, thereby suppressing roll when the vehicle turns.

In the suspension device 16 of this example embodiment, a rotational moment generated around the king pin axis is able to be reduced or eliminated by substantially aligning the bearing rotational axis with the king pin axis. Hereinafter, the specific structure of the suspension device 16 will be described.

Figure 2:
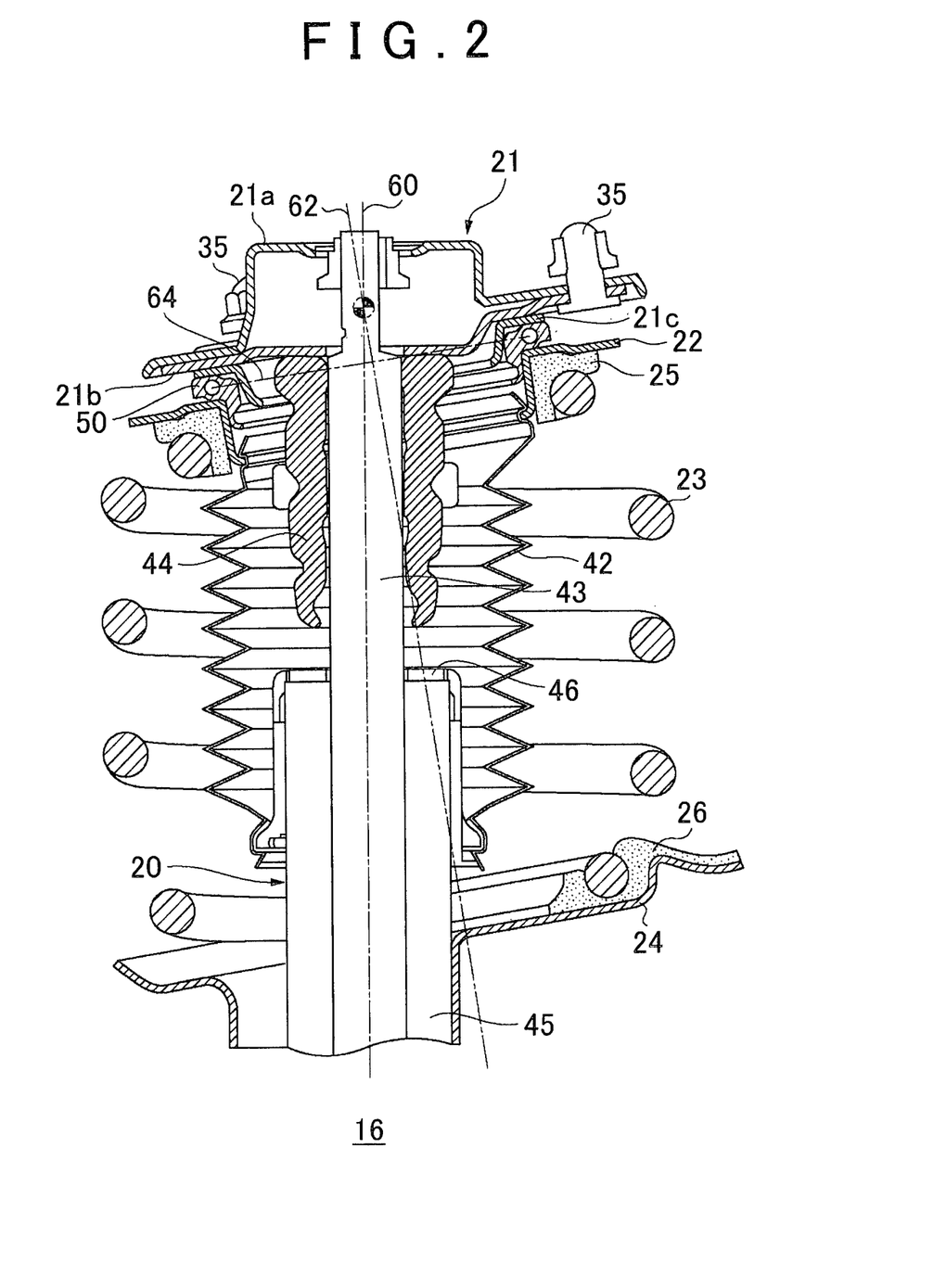
FIG. 2 is a partially cutaway sectional view of the main portions of the suspension device according to the example embodiment of the invention.

FIG. 2 is a partially cutaway sectional view of the main portions of the suspension device. The suspension device 16 includes the shock absorber 20 and the coil spring 23, and is configured as a strut-type suspension device. The shock absorber 20 has a stopper plate 46 provided sealing an upper end portion of the housing 45 of the shock absorber 20, and protrudes the piston rod 43, in a manner able to advance and retreat, from the center of an upper surface of the stopper plate 46 via an oil seal, not shown. The piston rod 43 is connected to the vehicle body via the upper support 21, and a bound stopper 44 that serves as a stopper when the shock absorber 20 retreats is provided on the piston rod 43.

The upper support 21 has a hollow structure in which a plurality of metal plates obtained by press forming are joined together by projection welding. More specifically, the upper support 21 forms a hollow structure by an upper plate 21a and a lower plate 21b, and includes a bearing mounting portion 21c that has a support surface for supporting a bearing 50, on a lower surface of the lower plate 21b. The hollow structure of the upper support 21 is fastened to the vehicle body via a bolt 35. An insertion hole is provided in the center of a bottom portion of the lower plate 21b, and an external thread portion formed on an upper end portion of the piston rod 43 is passed through this insertion hole. The shock absorber 20 is supported by the upper support 21, by screwing a nut onto this external thread portion via a collar, not shown, and vulcanized rubber being sandwiched between the upper plate 21a and the lower plate 21b.

The coil spring 23 is supported by the upper spring seat 22 via an upper insulator 25, and supported by the lower spring seat 24 via a lower insulator 26, and is arranged surrounding the shock absorber 20 between the upper spring seat 22 and the lower spring seat 24. The upper spring seat 22 is arranged facing the upper support 21 via the bearing 50, and is able to rotate relative to the upper support 21. The lower spring seat 24 is fixed by welding to the housing 45 of the shock absorber 20.

The bound stopper 44 has a cylindrical main body made of expanded polyurethane, and is arranged between the upper support 21 and the stopper plate 46 inside the coil spring 23. The bound stopper 44 is formed in a shape that becomes thinner toward the lower end, such that the lower end portion thereof is able to easily deform. The piston rod 43 is inserted through the bound stopper 44 along the axis thereof, and the bound stopper 44 causes deformation of the shock absorber 20 to reduce when the vehicle bounces. A suitable press fitting allowance is provided on the inner peripheral surface of the upper end portion of the bound stopper 44, and the upper end portion of the bound stopper 44 is press-fit onto, and thus engaged with, the piston rod 43.

A dust cover 42 has a bellows-type cylindrical main body obtained by injection molding rubber or resin or the like, and is arranged covering the bound stopper 44 and the shock absorber 20 from the outside, inside the coil spring 23. An upper end of the dust cover 42 is retained by an inner peripheral edge of the upper spring seat 22, such that foreign matter such as dust from above the dust cover 42 is inhibited from getting inside. The upper end portion of the dust cover 42 may also be integrally formed with the upper insulator 25. A lower end of the dust cover 42 contacts an outer peripheral surface of the stopper plate 46, thereby inhibiting foreign matter from getting in, but the lower end may also be open. The lower end of the dust cover 42 extends to near the lower spring seat 24, so even if the lower end is open, foreign matter is inhibited from getting in through the opening.

In the suspension device 16, the bearing 50 is arranged between the upper spring seat 22 and the upper support 21, and rotatably supports the upper spring seat 22 with respect to the upper support 21. The bearing 50 is mounted to the support surface of the bearing mounting portion 21c, and this support surface is inclined with respect to a plane perpendicular to a shock absorber axis 60. The bearing 50 is made by using vulcanized rubber or the like, for example, and is formed matching the shape of the bearing mounting portion 21c. The bearing 50 is mounted to the support surface of the bearing mounting portion 21c such that a rotational plane 64 of the bearing 50 is parallel to the support surface. That is, the bearing 50 is mounted to the support surface of the bearing mounting portion 21c such that the rotational axis of the bearing 50 is perpendicular to the support surface of the bearing mounting portion 21c. A rotational moment generated around a king pin axis 62 is able to be suppressed by making an angle between the support surface of the bearing mounting portion 21c and a king pin axis 62 substantially a right angle (90°), and substantially aligning the king pin axis 62 with the rotational axis of the bearing 50.

By inclining the support surface of the bearing mounting portion 21c with respect to the plane perpendicular to the shock absorber axis 60 in this way, the rotational axis of the bearing 50 is inclined with respect to the shock absorber axis 60 when the bearing 50 is mounted to the support surface. In the upper support 21 of this example embodiment, the rotational axis of the bearing 50 is able to be inclined with respect to the shock absorber axis 60 without having to insert an inclined member that is another component between the upper support 21 and the bearing 50, so a suspension device 16 that is less expensive and lighter can be provided.

By inclining the support surface of the bearing mounting portion 21c such that the angle between the support surface and the king pin axis 62 is a right angle, the rotational axis of the bearing 50 is able to be aligned with the king pin axis 62, so a rotational moment generated around the king pin axis 62 is substantially able to be eliminated.

Figure 3:
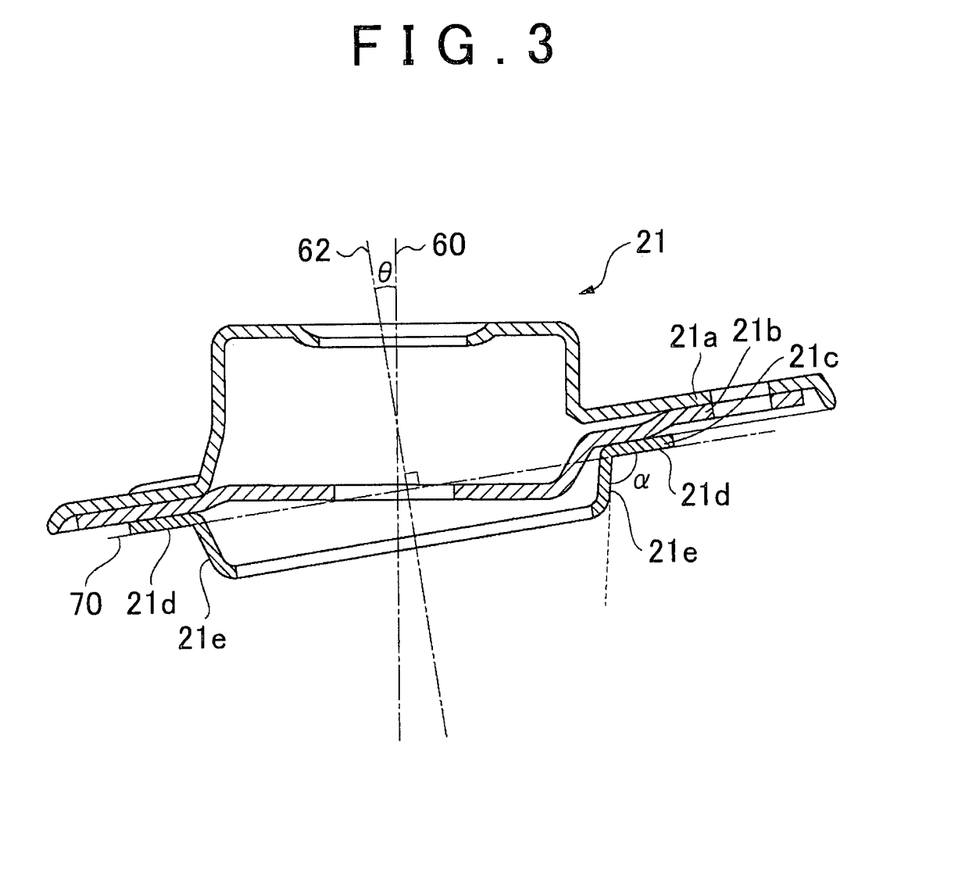
FIG. 3 is a view of the cross-section structure of an upper support according to the example embodiment of the invention.

FIG. 3 is a view of the cross-section structure of the upper support 21. As described above, the upper support 21 has a hollow structure formed by the upper plate 21a and the lower plate 21b, and includes the bearing mounting portion 21c for mounting the bearing 50 that abuts against it. The bearing mounting portion 21c includes an annular support surface 21d for supporting the bearing 50, and a protruding face 21e disposed around an inner peripheral end of the support surface 21d. The bearing mounting portion 21c is fixed to the lower plate 21b, at a back surface of the support surface 21d.

The upper support 21 of this example embodiment inclines the support surface 21d for mounting the bearing 50, with respect to the plane perpendicular to the shock absorber axis 60, such that the rotational axis of the bearing 50 is substantially aligned with the king pin axis 62. When the angle between the shock absorber axis 60 and the king pin axis 62 is $\theta$, the support surface 21d is preferably inclined by substantially $\theta$ with respect to the plane perpendicular to the shock absorber axis 60. As a result, when the king pin axis 62 is orthogonal to a support plane 70 that includes the support surface 21d, and the bearing 50 is mounted to the support surface 21d, the rotational axis of the bearing 50 will be substantially aligned with the king pin axis 62.

An angle $\alpha$ between the support surface 21d and the protruding face 21e is preferably greater than 90°, and more preferably, is equal to or greater than the sum of the angle $\theta$ between the king pin axis 62 and the shock absorber axis 60 plus 90°. The reason for this will be described below.

Figure 4:
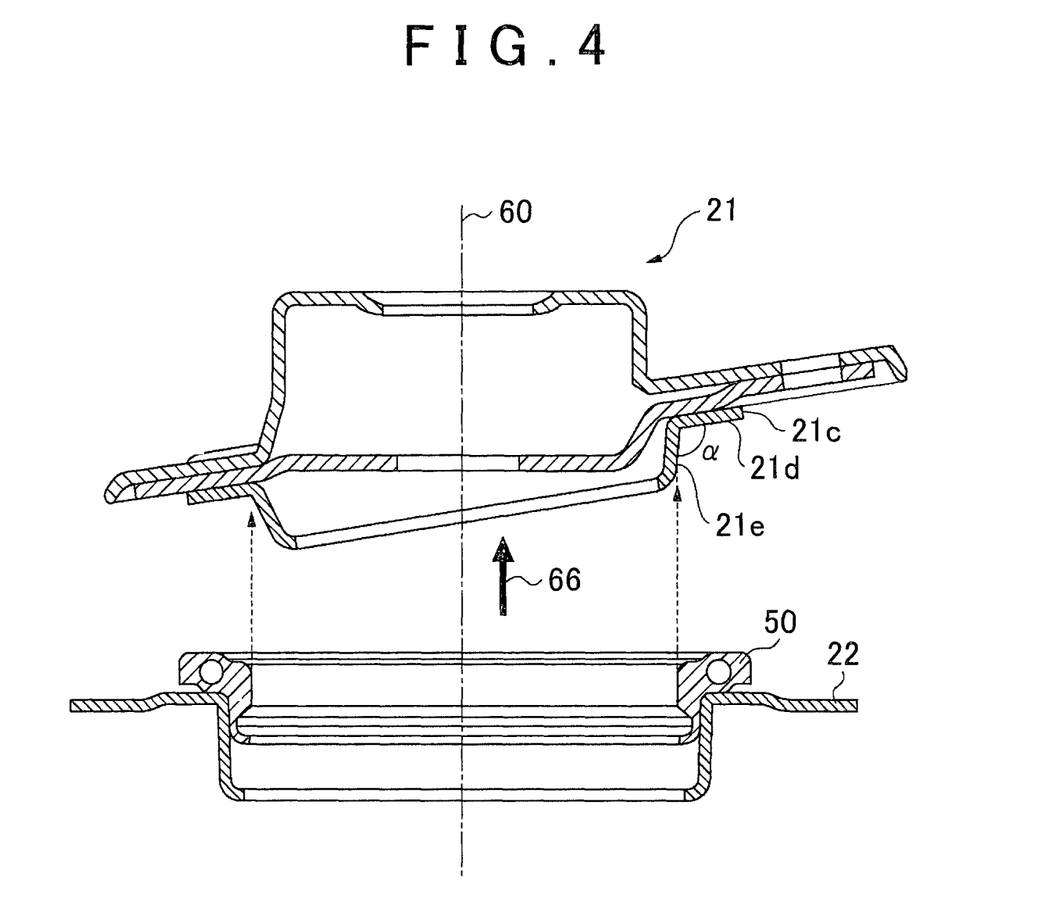
FIG. 4 is a view illustrating an assembly process of the suspension device that is a strut assembly according to the example embodiment of the invention.

FIG. 4 is a view illustrating an assembly process of the suspension device 16 that is a strut assembly. Below, the installation process of the bound stopper 44 and the dust cover 42 will be omitted to simplify the description.

In the assembly process, first the lower insulator 26 is placed on the lower spring seat 24 that is fixed to the shock absorber 20, and the lower end of the coil spring 23 is arranged on the lower insulator 26. Next, the upper insulator 25, the upper spring seat 22, and the bearing 50 are placed, in this order, onto the upper end of the coil spring 23. At this time, the coil spring 23 is fully expanded, and the upper end of the coil spring 23 protrudes out beyond the upper end of the piston rod 43. In this state, the upper spring seat 22 is pushed down with a jig, thereby compressing the coil spring 23. With the upper end of the coil spring 23 sufficiently pushed down, the upper end of the piston rod 43 is fixed to the upper support 21, and then the compression from the jig gradually relaxed, so the coil spring 23 expands, moving the bearing 50 in an insertion direction 66 so that it comes to be mounted to the support surface 21d of the bearing mounting portion 21c. This insertion direction 66 is the expansion direction of the coil spring 23, and is substantially the same as the direction of the shock absorber axis 60. Assembly of the suspension device 16 that is the strut assembly is completed by the process described above.

The assembly process shown in FIG. 4 illustrates a process by which the bearing 50 is moved in the insertion direction 66 and mounted to the bearing mounting portion 21c by relaxing the compression of the coil spring 23, after the upper end of the piston rod 43 has been connected to the upper support 21. At this time, the protruding face 21e is open greater than 90° (i.e., at an obtuse angle) with respect to the support surface 21d, so the protruding face 21e will not interfere with the insertion of the bearing 50 when the bearing 50 is inserted onto the support surface 21d. That is, the bearing 50 is able to be easily mounted to the support surface 21d without the protruding face 21e interfering with the bearing 50.

Figure 5:
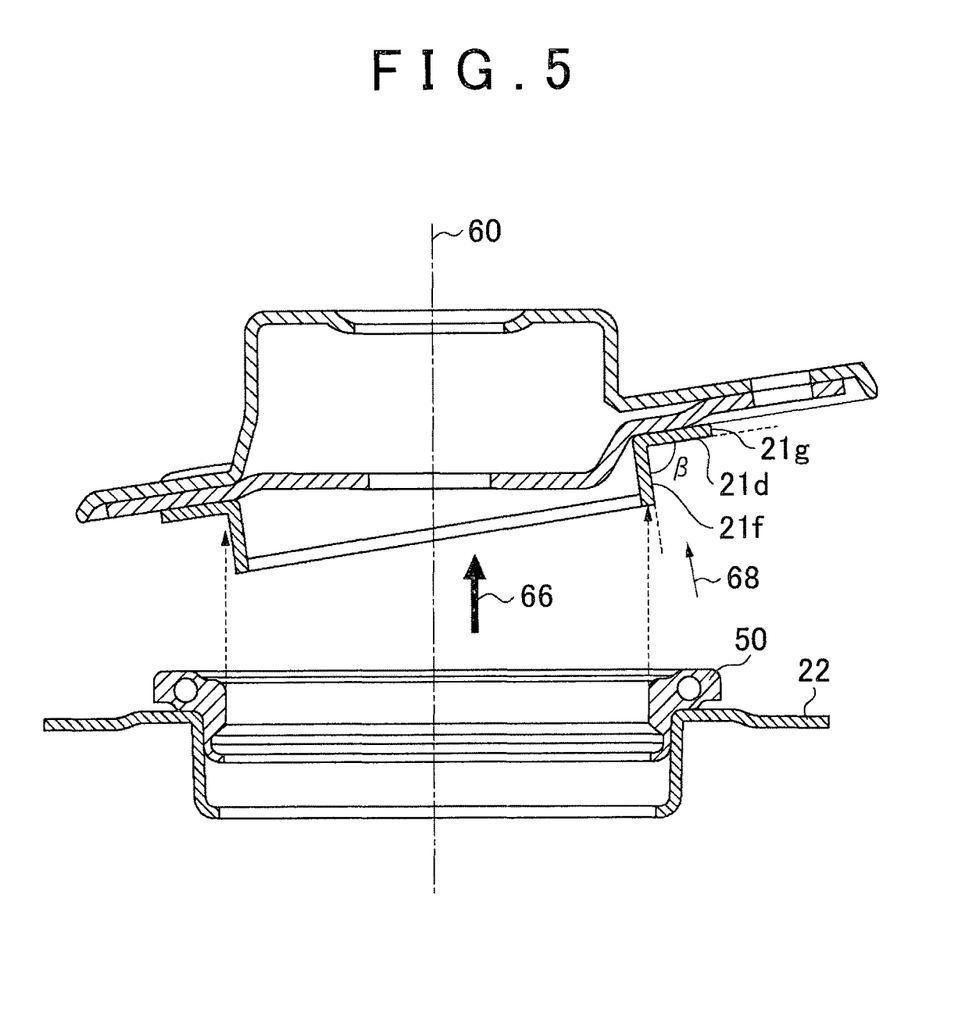
FIG. 5 is a view of comparative technology to compare with a bearing mounting portion of the example embodiment of the invention.

FIG. 5 is a view of comparative technology to compare with the bearing mounting portion 21c of the example embodiment. When a bearing mounting portion 21g shown by this comparative technology is compared to the bearing mounting portion 21c of the example embodiment, an angle $\beta$ between the support surface 21d and a protruding face 21f is substantially a right angle.

The assembly process shown in FIG. 5 also illustrates a process by which the bearing 50 is moved in the insertion direction 66 so that it approaches the bearing mounting portion 21g by relaxing the compression of the coil spring 23, after the upper end of the piston rod 43 has been connected to the upper support 21, similar to the assembly process shown in FIG. 4. As shown in the drawing, the protruding face 21f shown on the right side in the drawing will interfere with the bearing 50 before the bearing 50 is inserted onto the support surface 21d, due to the angle between the protruding face 21f and the support surface 21d being a right angle. Therefore, in order to mount the bearing 50 to the support surface 21d, the bearing 50 must first be inclined by an angle $\theta$ with respect to the plane perpendicular to the shock absorber axis 60, and then be inserted onto the support surface 21d from an insertion direction 68. This complicates the assembly process, which is undesirable.

Therefore, returning to FIG. 4, with the bearing mounting portion 21c of the example embodiment, the protruding face 21e is inclined by an angle $\alpha$ (90°+$\theta$) with respect to the support surface 21d, so the bearing 50 is able to be easily inserted onto the support surface 21d, thereby realizing a simple assembly process. The angle $\alpha$ need only be equal to or greater than (90°+$\theta$). By setting the angle $\alpha$ in this way, the protruding face 21e will not interfere with the movement of the bearing 50 in the insertion direction 66 in the assembly process.

The invention is not limited to the example embodiment described above. Various modifications such as design changes based on knowledge of one skilled in the art may also be applied. The structure in the drawings illustrates one example. The structure may be changed as appropriate as long as it is able to achieve a similar function. In the example embodiment, the rotational axis of the bearing 50 is substantially aligned with the king pin axis 62, but a rotational moment generated around the king pin axis 62 may also be reduced by at least making an angle γ between the rotational axis of the bearing 50 and the king pin axis 62 smaller than the angle θ between the shock absorber axis 60 and the king pin axis 62.

What is claimed is:

1. A strut-type suspension device comprising:
   an upper support;
   a shock absorber that is supported by the upper support;
   a coil spring that is arranged surrounding the shock absorber, between an upper spring seat and a lower spring seat; and
   a bearing that is arranged between the upper spring seat and the upper support, wherein
   the upper support includes a mounting portion that has a support surface for supporting the bearing; and
   the support surface is inclined with respect to a plane perpendicular to a shock absorber axis,
   wherein the mounting portion includes the support surface, and a protruding face disposed around an inner peripheral edge of the support surface; and an angle between the support surface and the protruding face is greater than 90°.

2. The strut-type suspension device according to claim 1, wherein
   an angle between the support surface and a king pin axis is substantially a right angle; and
   the king pin axis and a bearing rotational axis are substantially aligned.

3. The strut-type suspension device according to claim 1, wherein
   the angle between the support surface and the protruding face is equal to or greater than a sum of an angle between a king pin axis and the shock absorber axis plus 90°.

* * * * *